(12) United States Patent
Zhao

(10) Patent No.: US 11,362,856 B2
(45) Date of Patent: Jun. 14, 2022

(54) PROCESSING OPERATION REQUESTING METHOD AND DEVICE

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 350 days.

(21) Appl. No.: 16/347,649

(22) PCT Filed: Sep. 19, 2017

(86) PCT No.: PCT/CN2017/102214
§ 371 (c)(1),
(2) Date: May 6, 2019

(87) PCT Pub. No.: WO2018/086413
PCT Pub. Date: May 17, 2018

(65) Prior Publication Data
US 2021/0288834 A1    Sep. 16, 2021

(30) Foreign Application Priority Data
Nov. 11, 2016  (CN) .......................... 201610994874.2

(51) Int. Cl.
G06F 15/173    (2006.01)
H04L 12/28     (2006.01)

(52) U.S. Cl.
CPC ...... H04L 12/2838 (2013.01); H04L 12/2814 (2013.01); H04L 12/2823 (2013.01)

(58) Field of Classification Search
None
See application file for complete search history.

(56) References Cited

U.S. PATENT DOCUMENTS

2002/0147813 A1* 10/2002 Teng ..................... H04L 67/306
                                                             709/225
2003/0014533 A1*  1/2003 Greene ................ G06Q 10/107
                                                             709/232
2012/0324120 A1* 12/2012 Lee .................. H04N 21/43615
                                                             709/228

(Continued)

FOREIGN PATENT DOCUMENTS

CN    104869532 A    8/2015
CN    105634989 A    6/2016

(Continued)

OTHER PUBLICATIONS

English translation of Extended European Search Report in EP Application No. 17870069.6 dated Mar. 17, 2020.

(Continued)

*Primary Examiner* — Phyllis A Book
(74) *Attorney, Agent, or Firm* — Collard & Roe, P.C.

(57) ABSTRACT

A processing operation requesting method and device using associated groups. Specifically, the processing operation requesting method of the present invention includes: receiving an operation request; sending the operation request to a first entity group for processing; determining at least one second entity group associated the first entity group; and sending the operation request to the at least one second entity group for processing.

18 Claims, 11 Drawing Sheets

(56) References Cited

U.S. PATENT DOCUMENTS

| | | | | |
|---|---|---|---|---|
| 2014/0207769 | A1* | 7/2014 | Marbach | G06Q 10/04 707/723 |
| 2014/0369251 | A1* | 12/2014 | Zhang | H04L 12/1877 370/312 |
| 2017/0215026 | A1* | 7/2017 | Kim | H04W 4/00 |
| 2018/0176745 | A1* | 6/2018 | Yang | H04L 67/12 |
| 2018/0288184 | A1 | 10/2018 | Yang | |

FOREIGN PATENT DOCUMENTS

| | | | | |
|---|---|---|---|---|
| CN | 105681210 A | 6/2016 | | |
| CN | 105703979 A | 6/2016 | | |
| EP | 2 547 040 A1 | 1/2013 | | |
| EP | 2547040 A1 * | 1/2013 | | H04L 41/0893 |
| EP | 2 706 729 A1 | 3/2014 | | |
| EP | 3 220 671 A1 | 9/2017 | | |
| WO | 2005032101 A1 | 4/2005 | | |
| WO | 2016/011373 A1 | 1/2016 | | |
| WO | WO-2016011373 A1 * | 1/2016 | | H04L 67/125 |
| WO | 2016/074455 A1 | 5/2016 | | |

OTHER PUBLICATIONS

Document of "Group Management in GwMO", OMA-DM-GwMO-2010-0038, Open Mobile Alliance Ltd., 2010, Slides 1-12 (12 pages).
International Search Report of PCT/CN2017/102214 in Chinese, dated Dec. 25, 2017, with English translation.
Notice of Transmittal of the International Search Report of PCT/CN2017/102214 in Chinese, dated Dec. 25, 2017.
International Preliminary Report on Patentability of PCT/CN2017/102214, dated May 14, 2019 and Written Opinion of the International Searching Authority of PCT/CN2017/102214 in Chinese, dated Dec. 25, 2017 with English translation.
Chinese Office Action in Chinese Application No. 201610994874.2 dated Oct. 22, 2021.

\* cited by examiner

US 11,362,856 B2

PROCESSING OPERATION REQUESTING METHOD AND DEVICE

CROSS REFERENCE TO RELATED APPLICATIONS

This application is the National Stage of PCT/CN2017/102214 filed on Sep. 19, 2017, which claims priority under 35 U.S.C. § 119 of Chinese Application No. 201610994874.2 filed on Nov. 11, 2016, the disclosure of which is incorporated by reference.

TECHNICAL FIELD

The present disclosure relates to the field of information technology, and more particularly to a method and device for processing an operation request by using associated groups.

BACKGROUND

At present, with the development of network technology, more and more devices are connected to network. To simplify management and control of devices, multiple devices or application entities may be grouped. A group is formed by combining individuals of the same type or different types, such that bulk operations, such as information reading, information storing, information subscribing, notifying, equipment managing, and so on, can be carried out for the group. When a group receives an operation request, the group forwards the request to each member in the group, and can gather the results sent by respective members.

SUMMARY

The present disclosure provides a method and device for processing an operation request by using associated groups.

According to an aspect of the present disclosure, there is provided a method for processing an operation request, comprising:

receiving an operation request;

sending the operation request to a first entity group for processing;

determining at least one second entity group associated with the first entity group; and sending the operation request to the at least one second entity group for processing.

According to another aspect of the present disclosure, there is provided another method for processing an operation request, comprising:

sending an operation request so as to activate a first entity group to process the operation request; and sending, according to a processing result of the first entity group, the operation request to at least one second entity group associated with the first entity group for processing.

According to another aspect of the present disclosure, there is provided a control device, comprising:

a transceiver configured to receive an operation request from an entity and send the operation request to a first entity group for processing; and a processor configured to determine at least one second entity group associated with the first entity group, and instruct the transceiver to send the operation request to the at least one second entity group for processing.

According to another aspect of the present disclosure, there is provided a communication device, comprising:

a transceiver configured to send an operation request to activate a first entity group to process the operation request; and a processor configured to instruct, according to a processing result of the first entity group, the transceiver to send the operation request to at least one second entity group associated with the first entity group for processing.

The method and device for processing an operation request as disclosed in the embodiments of the present disclosure can, by means of associating a plurality of groups and using associated respective groups to process an operation request, achieve bulk processing of the operation request, thus improve automation level and management efficiency.

BRIEF DESCRIPTION OF THE DRAWINGS

In order to describe the technical solutions in the embodiments of the present disclosure more clearly, the accompanying drawings of the embodiments will be introduced briefly below. Apparently, the accompanying drawings in the following description only relate to some embodiments of the present disclosure, rather than for limiting the present disclosure.

DETAILED DESCRIPTION OF THE EMBODIMENTS

Hereinafter, the technical solutions in the embodiments of the present disclosure will be described clearly and comprehensively in conjunction with the accompanying drawings. Obviously, these described embodiments are merely parts of the embodiments of the present disclosure, rather than all of the embodiments thereof. Other embodiments obtained by a person of ordinary skill in the art based on the embodiments of the present disclosure without paying creative effort all fall into the protection scope of the present disclosure.

Figure 1:
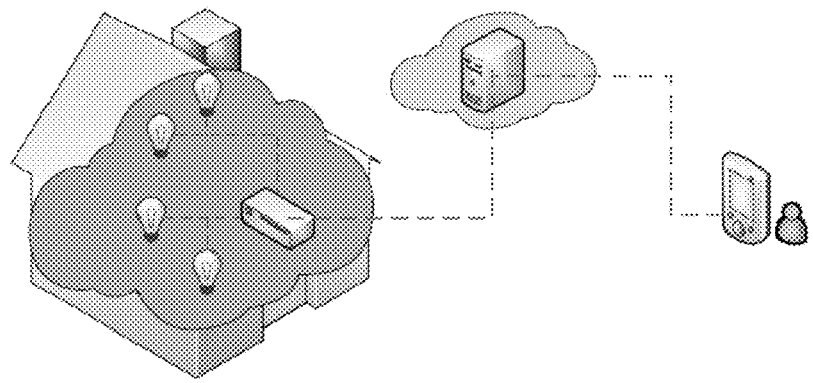
FIG. 1 is a schematic network to which the principles of the present disclosure may be applied.

FIG. 1 shows a schematic network to which the principles of the present disclosure may be applied. As shown in FIG. 1, for example, a user may connect to a home gateway via a server by using a mobile phone, so as to control family appliances (e.g., a lighting device) through the home gateway. According to an embodiment of the present disclosure, family appliances may be divided into a plurality of groups, association relationships may be established among the groups, and the association relationships among the groups may be utilized to process the user's operation request.

Figure 2A:
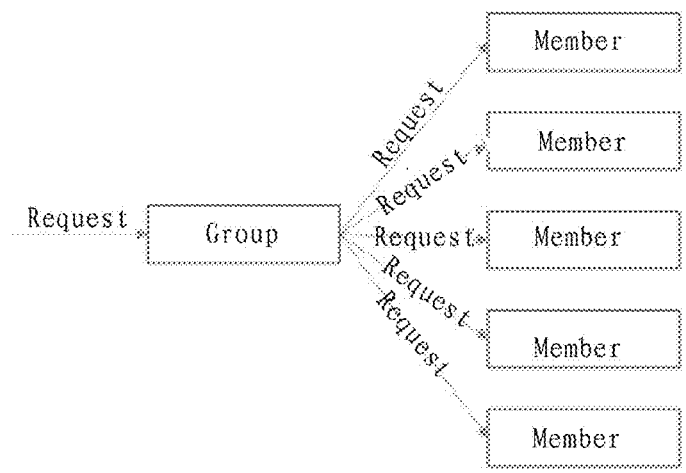
FIGS. 2A-2B are schematic diagrams of processing an operation request by using a group.
Figure 2B:
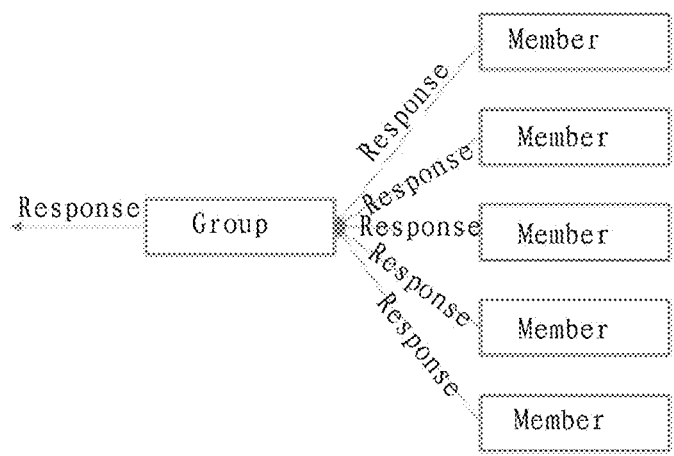

FIGS. 2A-2B show schematic diagrams of processing an operation request by using a group, wherein the group includes one or more members capable of executing an operation request. As shown in FIG. 2A, when an operation request from a requester is received, the established group sends the operation request to each member in the group, and the operation request is processed and executed by respective members in the group; thereafter, as shown in FIG. 2B, when processing of the operation request is completed, the respective members feed respective processing results back as responses, so that the respective processing results are gathered, and returned to the requester of the operation request.

Figure 3A:
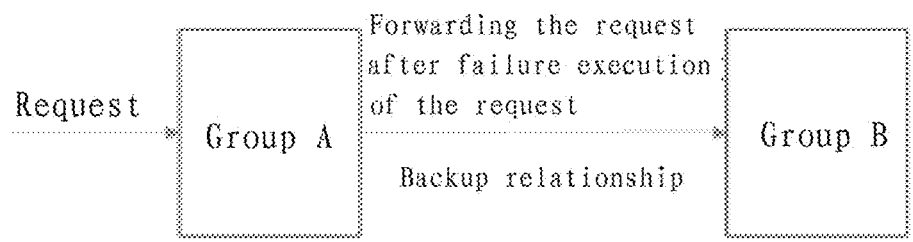
FIGS. 3A-3D are schematic diagrams of processing an operation request based on an association relationship among respective groups according to an embodiment of the present disclosure.
Figure 3B:
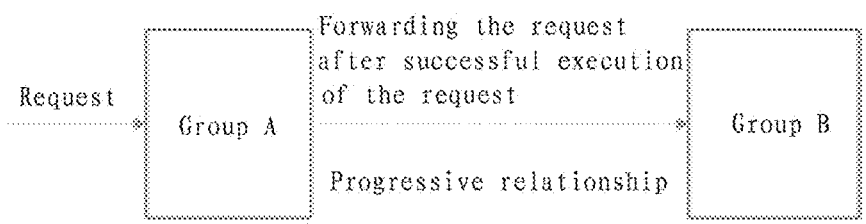
Figure 3C:
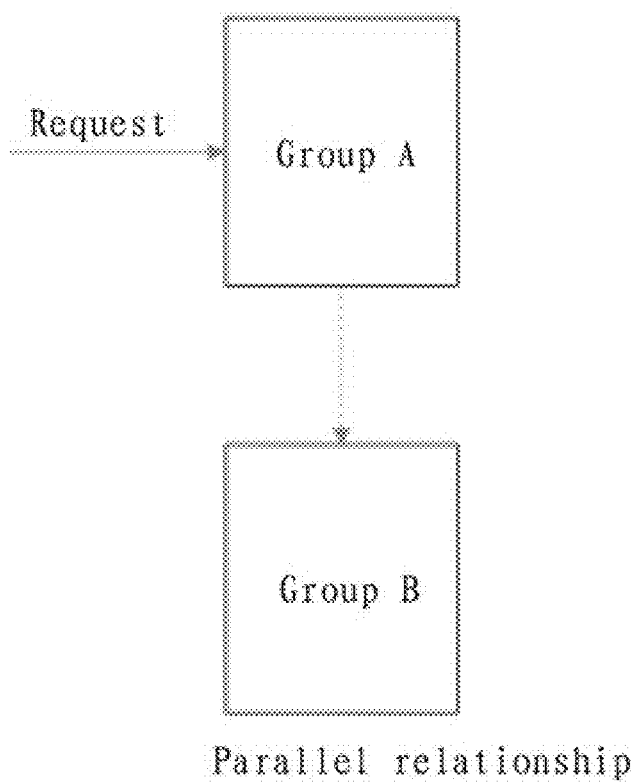

According to an embodiment of the present disclosure, a plurality of groups may be established for processing the same operation request. A variety of association relationships may be established between respective groups, for example, backup relationship, progressive relationship, or parallel relationship etc. Optionally, for example, the backup relationship refers to that, as for the same operation request, there is a backup relationship between at least two groups, as shown in FIG. 3A, when members in one group fail to successfully execute the operation request, the operation request is forwarded to another group that has the backup relationship with said group, and the members in said another group are activated to execute the operation request; in other words, as for the operation request, there is a backup relationship between the two groups to ensure that members in at least one group can successfully execute the operation request. Optionally, for example, the progressive relationship refers to that, as for the same operation request, there is a progressive relationship between at least two groups, as shown in FIG. 3B, when members in one group have successfully executed the operation request, the operation request is then forwarded to another group that has the progressive relationship with said group, and the members in said another group are activated to also execute the operation request; in other words, as for the operation request, the two groups are in a progressive relationship to achieve that in the case where members in one group have successfully executed the operation request, the members in at least another group are activated to also execute the operation request. Optionally, for example, the parallel relationship refers to that, as for the same operation request, there is a parallel relationship between at least two groups, as shown in FIG. 3C, when the operation request is sent to the first group, another group that has a parallel relationship with the first group is determined by querying an association identifier and an association attribute value of a resource corresponding to the first group; thereby when members in the first group are activated to execute the operation request, members in another group that has a parallel relationship with the first group are also activated to process the operation request; in other words, as for the operation request, the two groups are in a parallel relationship, so that members in the first group and members in the second group execute the operation request, respectively. In this case, the operation request can be processed in parallel by using a plurality of groups.

Figure 3D:
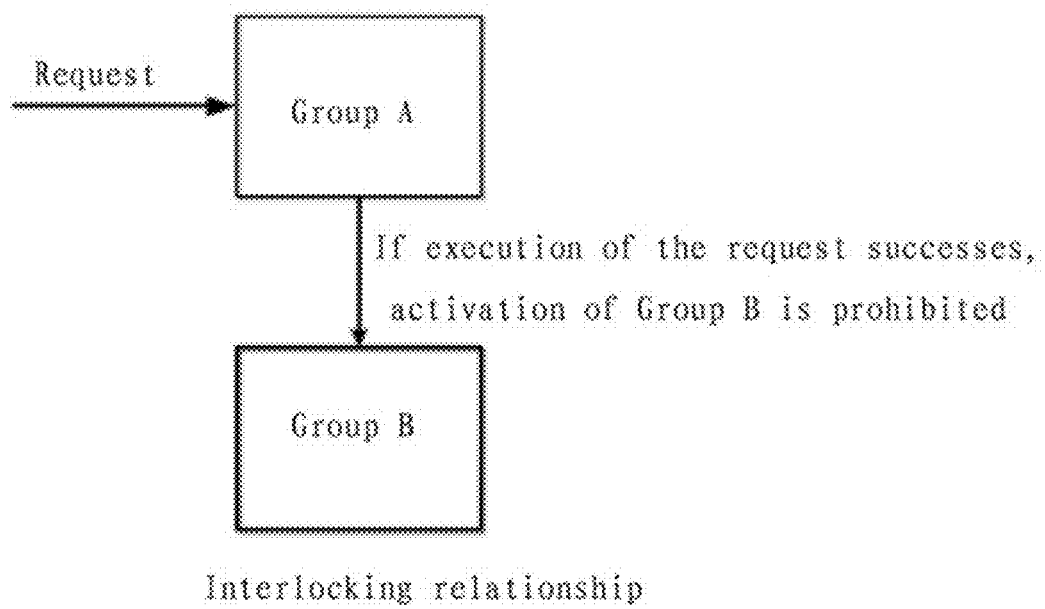

Although the association relationship between groups is described above, it should be understood that, the backup relationship, progressive relationship, and parallel relationship described above are merely exemplary explanations for explaining the principles of the present disclosure. For a person skilled in the art, other association relationships, such as interlocking relationship, may also be established between groups according to application requirements. Optionally, as shown in FIG. 3D, interlocking refers to that there is an interlocking relationship between at least two groups, when one group has successfully executed an operation request, the other group that has an interlocking relationship with said group is prohibited from being activated. In other words, as for the operation request, the two groups are in an interlocking relationship, so that the members in the first group or the members in the second group execute the operation request alone, rather than that the members in the first group and the members in the second group execute the operation request in a hybrid manner. The embodiment of the present disclosure is merely illustrative and not exhaustive, thus the principles of the present disclosure can also be applied to groups having other association relationships to produce new implementations without departing from the scope of the present disclosure.

Figure 4:
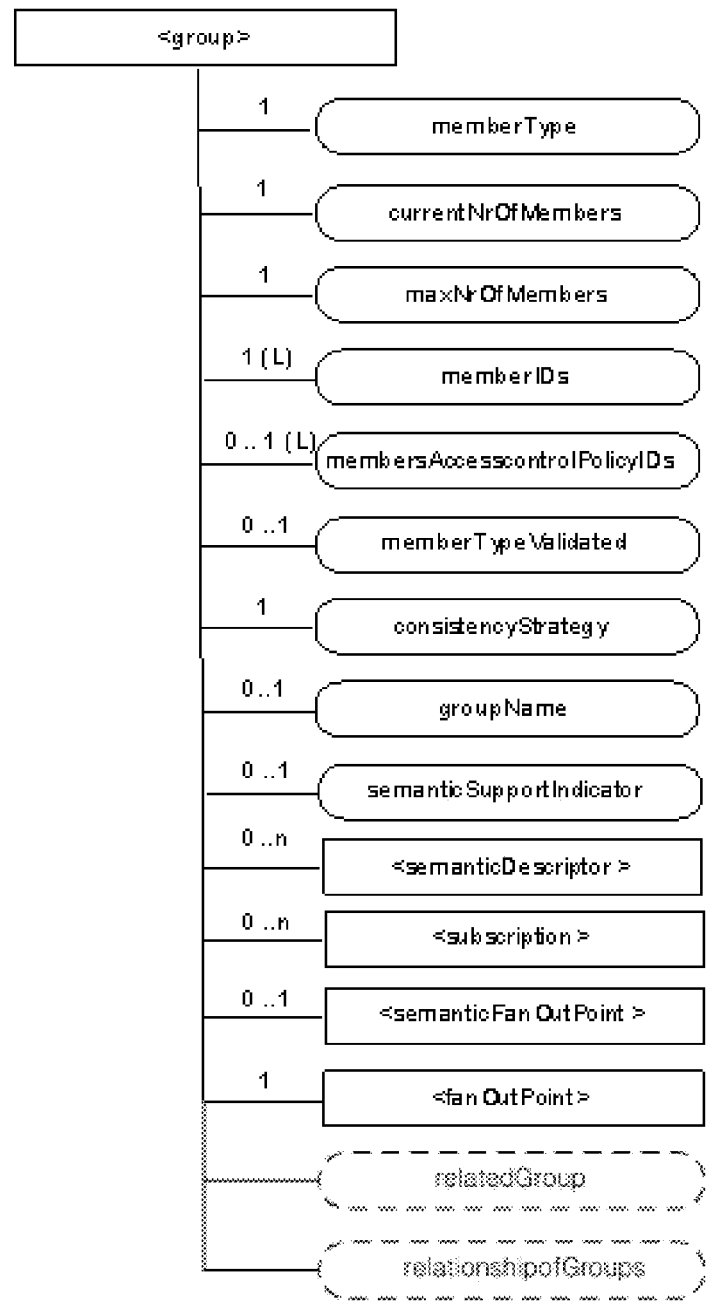
FIG. 4 is a schematic diagram of adding an association identifier and an association attribute value to a resource of a group according to an embodiment of the disclosure.

The principles of the present disclosure will be described below in conjunction with a group management scenario under an IOT (Internet of Things) M2M architecture. However, it should be understood that, the principles of the present disclosure are not limited to this specific case. In fact, the principles of the present disclosure can also be implemented when other network architecture protocols are employed. FIG. 4 is a schematic diagram of adding an association identifier and an association attribute value to a resource of a group according to an embodiment of the disclosure. As shown in FIG. 4, two attributes, namely, the association identifier relatedGroup and the association attribute value relationshipofGroups, are added in a resource of a group. The association identifier relatedGroup may indicate an identifier of a resource (e.g., other entity groups) associated with an entity group, and the association attribute value relationshipofGroups may indicate an association relationship between the entity group and the other resources (e.g., other entity groups), for example, backup relationship, progressive relationship, parallel relationship, interlocking relationship, and so on. Optionally, identifiers of other resources that have an association relationship with an entity group are set in the association identifier relatedGroup, for example, a resource identifier ID or a resource name of another entity group that is associated with the entity group may be set.

Accordingly, identifiers of other resources (e.g., other entity groups) associated with the entity group and the relationships between them may be queried according to the association identifier and the association attribute value which are set in the resource of the entity group, so that members in a plurality of entity groups can be employed to process the operation request from the requester, an operation instruction corresponding to the operation request can be executed in bulk members, this improving automation level and management efficiency of device management.

Figure 5:
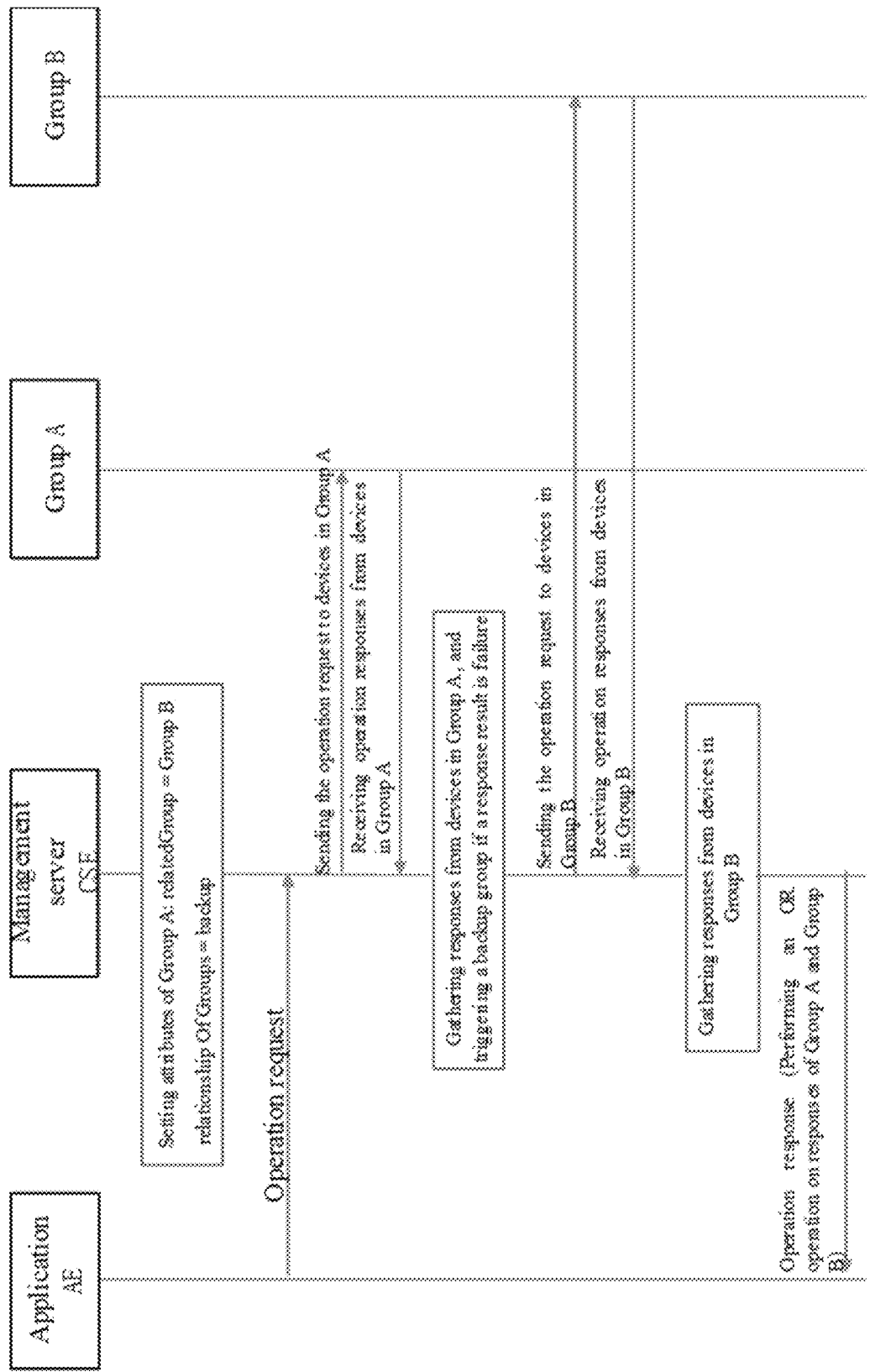
FIG. 5 illustrates an exemplary process of processing an operation request by using associated groups according to an embodiment of the present disclosure.

The process of implementing that a plurality of groups are employed to process the operation request from the requester by using the added association identifier relatedGroup and the association attribute value relationshipofGroups according to an embodiment of the present disclosure will be described below with reference to FIG. 5.

According to the principles of the present disclosure, attributes of a group may be set on a common service entity CSE under, for example, an M2M protocol framework in a management server, for example, an association identifier relatedGroup and an association attribute value relationshipofGroups corresponding to a group resource corresponding to a first group are set. For the sake of simplicity, in the embodiment illustrated in FIG. 5, two groups, namely a first group A and a second group B, are adopted for description, wherein each group includes at least one member capable of executing an operation request of the requester. For example, an association identifier relatedGroup in a group resource corresponding to the first group A is set to point to an identifier of the second group B, and the association attribute value relationshipofGroups may be set as a backup relationship. Thus, the first group A and the second group B are associated, and the association relationship between them is set as the backup relationship. As shown in FIG. 5, an entity sends an operation request to the management server, for example, an application entity AE sends an operation request to the common service entity CSE. Upon receiving the operation request, the CSE processes the request, obtains information on a group for executing the operation request and members in the group, and forwards the operation request to all members in the group. In the example shown in FIG. 5, the CSE obtains information on the first group A and the members in the first group A, and forwards the operation request to all members in the first group A. Optionally, when the CSE processes the operation request, the CSE may firstly authenticate an identity of the requester of the operation request, and after identity authentication has been successfully passed, the CSE may further select a group for executing the operation request. As shown in FIG. 5, upon receiving the operation request sent from the CSE, all members included in the first group A are activated to execute the operation request, and execution results are returned as feedback to the CSE. The CSE receives execution results returned by all members in the first group A, and analyzes, gathers the results to determine whether the operation request has been successfully executed. When the first group A includes more than one member, various policies may be set to determine whether the operation request has been successfully executed. For example, a policy may be set as follows: it is determined that the operation request has been successfully executed by the first group A, only when all members in the first group A have successfully executed the operation request. Or, it may be set that, as long as more than half of the members in the first group A have successfully executed the operation request, it is determined that the operation request has been successfully executed by the group A. A specific determination policy may be determined according to application requirements, it is not limited herein. Alternatively, it may be determined based on the association attribute value whether the operation request has been successfully executed. For example, the association relationship indicated by the association attribute value is subdivided, if the backup relationship indicated by the association attribute value belongs to a full backup relationship, members in group B are activated to process the operation request only after all members in group A fail to process the operation request; and if the backup relationship belongs to a partial backup relationship, members in group B are activated to process the operation request after parts of the members in group A fail to process the operation request; and other relationships may be deduced, which are not described herein any more. As shown in FIG. 5, if the CSE determines that the operation request is not successfully executed by the first group A after analyzing, gathering the responses from the members in the first group A, in other words, execution of the operation request by the first group A is determined as failed, a backup group of the first group A can be determined by querying the association identifier and the association attribute value set in the group resource of the first group A. For example, if the association identifier relatedGroup in the group resource corresponding to the first group A points to the identifier of the second group B, and the association attribute value relationshipofGroups is set as the backup relationship, it can be determined that the second group B is a backup group of the first group A. In this case, the second group B that is a backup group can be triggered to execute the operation request. Specifically, the CSE obtains information on the second group B and the members in the second group B, and forwards the operation request to all members in the group B. As shown in FIG. 5, upon receiving the operation request sent from the CSE, all members included in the second group B are activated to execute the operation request, and execution results are returned as feedback to the CSE. The CSE receives the execution results returned by all members in the second group B, and analyzes, gathers the results to determine whether the operation request has been successfully executed. Similarly, when the second group B includes more than one member, various policies may be set to determine whether the operation request has been successfully executed. Afterwards, the CSE can return feedback information on execution of the operation request to the requester. For example, when the operation request has been successfully executed by either the first group A or the second group B, the CSE returns a response of successful execution of the operation request to the requester. On the contrary, only when the first group A and the second group B both fail to execute the operation request, the CSE returns the information that the operation request fails to the requester.

For the above embodiment of the present disclosure to be more intuitive, the solution of this embodiment is described below with a specific application example. For example, in the scenario illustrated above in FIG. 1, the user's mobile phone may access the home gateway in the home through a wireless network, an application capable of remotely controlling family appliances through an application of the home gateway may be installed in the mobile phone, for example, it is possible to control lighting facility (e.g., lights in individual rooms), thermostat facility (e.g., air conditioning or heating in a room), or sanitary facility (e.g., electric water heater), cooking facility (e.g., electric rice cooker), and so on through an application of the home gateway. Herein, the application in the mobile phone may serve as a requester that sends the operation request in FIG. 5, that is, the entity that sends the request, and the corresponding application in the home gateway may serve as the management server or the common service entity CSE, and may create application entity groups corresponding to different types of facility in the home respectively, for example, groups corresponding to lighting facility, thermostat facility, or sanitary facility, respectively, and each of the groups include members capable of executing the operation request (e.g., executing the operation request for turning on the corresponding facility). For example, when an activation operation request is received, the light in the room is turned on, the air conditioner or the warming device is turned on, and the electric water heater is turned on for heating, so that when the user arrives at home, various facilities are prepared. Alternatively, it is also possible to set the facility in one room as a group without specific restrictions, in which case one group may include different types of application entities, upon receiving an activation operation, each of the entities in the room is activated. As an example, the user may set respective groups in the application of the home gateway and associate the respective groups in advance.

As another example, the user may set functions related to the access control system of the user's home in the application of the mobile phone. When the user's mobile phone approaches the access control system, the access control system authenticates user identity. After the authentication has been passed, the access control system is opened and at the same time an operation request for turning on the hallway lights is issued to the home gateway. For example, the hallway lights may be divided into two lightning groups that are of a backup relationship, and two groups corresponding to the first lighting group and the second lighting group are established and associated. The CSE in the home gateway firstly issues an activation instruction to the first lighting group to turn on the first lighting group and receives a response from the first lighting group. If the response returned by the first lighting group is received, the CSE determines that the first lighting group is malfunctioning and cannot be turned on, the CSE queries the association identifier and the association attribute value in the group resource corresponding to the first group to activate the second lighting group that serves as a backup relationship. In this way, the second lighting group can be turned on in time even if the first lighting group fails to be turned on because of some fault, thus redundant control over the lights can be realized, so that when the user passes through the access control system and enters the hall, one lighting group in the hall has already been turned on, thus avoiding inconvenience of that the user turns on the lights in dark.

In the above example, since the backup relationship is established between two entity groups and the two groups are associated, redundancy control is realized, when the members in one entity group fail to execute the operation request because of a failure, the members in another entity group can be activated in time to execute the operation request, this improves automation level and management efficiency.

Figure 6:
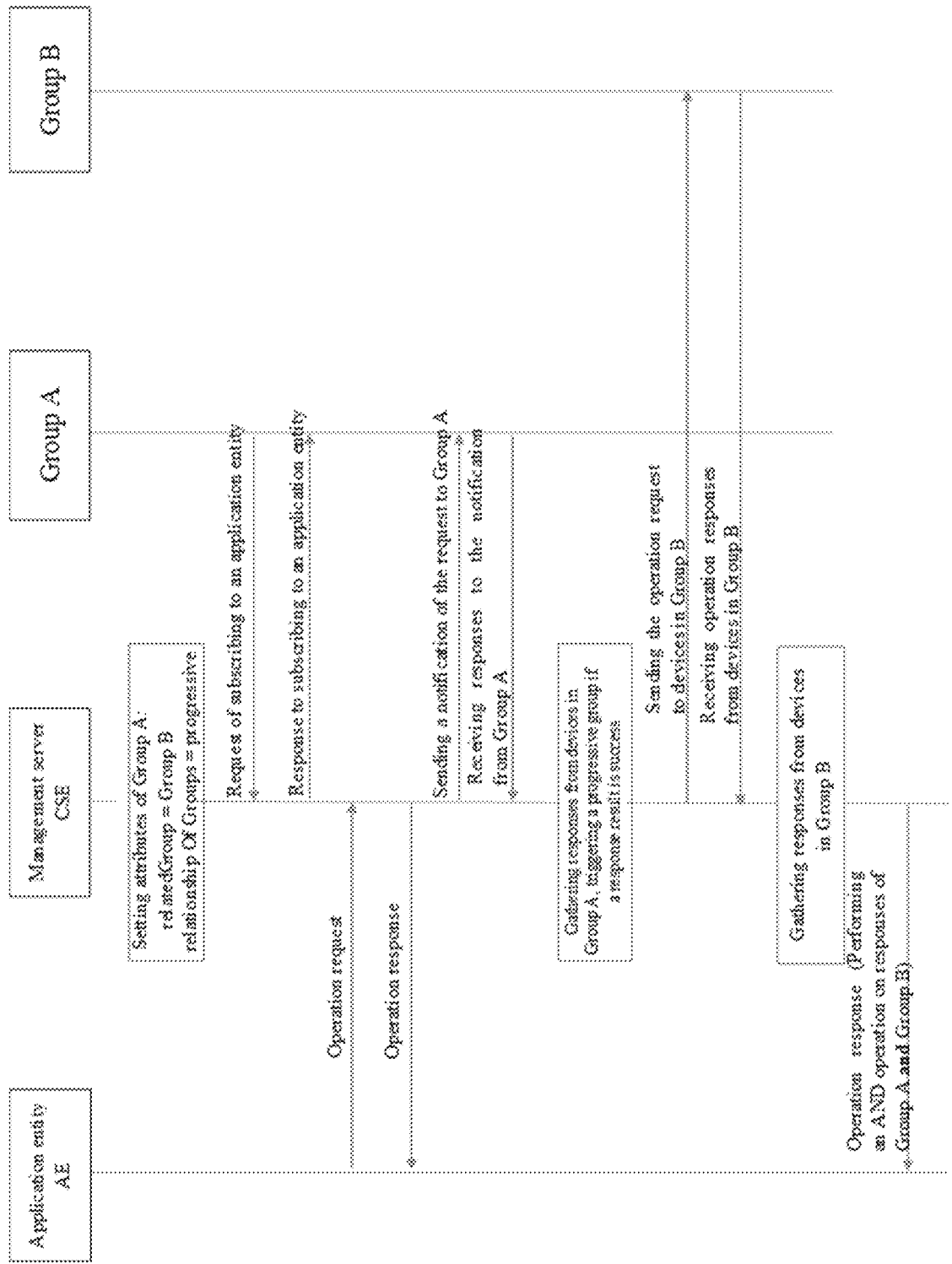
FIG. 6 illustrates another schematic process of processing an operation request by using associated groups according to an embodiment of the present disclosure.

The process of using the added association identifier relatedGroup and the association attribute value relationshipofGroups to implement that a plurality of groups process the operation request from the requester according to another embodiment of the present disclosure will be described below with reference to FIG. 6.

In this embodiment, the first group A and the second group B are also adopted for description, wherein each group includes at least one member capable of executing an operation request from the requester. For example, an association identifier relatedGroup in a group resource corresponding to the first group A is set to point to an identifier of the second group B, and the association attribute value relationshipofGroups may be set to be a progressive relationship. Thus, the first group A and the second group B are associated, and the association relationship between them is set as a progressive relationship. As shown in FIG. 6, optionally, the first group A may subscribe to an application entity request to the management server (e.g., the common service entity CSE), so that when the CSE receives an operation request from an application entity, the first group A can be notified in time in order to trigger the members in the first group A to process the operation request. As shown in FIG. 6, an entity sends an operation request to the management server, for example, the application entity AE sends an operation request to the common service entity CSE. Upon receiving the operation request, the CSE processes the request, obtains information on the group to execute the operation request and the group members, and forwards the operation request to all members in the group. In the example shown in FIG. 6, the CSE obtains information on the first group A and the members in the first group A, and forwards the operation request to all members in the first group A. Optionally, when the CSE processes the operation request, the CSE may firstly authenticate an identity of the requester of the operation request. After the authentication has been successfully passed, the CSE notifies the first group A that subscribes to the application entity request. As shown in FIG. 6, upon receiving the operation request sent from the CSE, all members included in the first group A are activated to execute the operation request, and execution results are returned as feedback to the CSE. The CSE receives the execution results returned by all members in the first group A, and analyzes, gathers the results to determine whether the operation request has been successfully executed. When the first group A includes more than one member, various policies may be set to determine whether the operation request has been successfully executed, or whether the operation request has been successfully executed may be determined based on the association attribute value. For example, it can be set as that, only when all members in the first group A have successfully executed the operation request, it is determined that the operation request has been successfully executed by the first group A. Or, it may be set that, as long as more than half of the members in the first group A have successfully executed the operation request, it is determined that the operation request has been successfully executed by the first group A. The specific determination policy can be determined according to application requirements, which is not limited herein. As shown in FIG. 6, if the CSE determines that the operation request has been successfully executed by the first group A after gathering, analyzing the responses from the members in the first group A, the CSE may query the association identifier and the association attribute value in the group resource set for the first group A to determine a group that has a progressive relationship with the first group A. For example, if the association identifier relatedGroup in the group resource corresponding to the first group A points to the identifier of the second group B, and the association attribute value relationshipofGroups is set as the progressive relationship, it may be determined that the second group B is the group that has a progressive relationship with the first group A. At this moment, the second group B, which serves as a progressive relationship, may be triggered to execute the operation request as well. Specifically, the CSE obtains information on the second group B and the members in the second group B, and forwards the operation request to all members in the group B. As shown in FIG. 6, upon receiving the operation request sent from the CSE, all members included in the second group B are activated to execute the operation request, and execution results are returned as feedback to the CSE. The CSE receives the execution results returned by all members in the second group B, and analyzes, gathers the results to determine whether the operation request has been successfully executed. Similarly, when the second group B includes more than one member, various policies may be set to determine whether the operation request has been successfully executed. Afterwards, the CSE can return feedback information on execution of the operation request to the requester. In a progressive relationship, for example, the CSE returns a response of successful execution of the operation request to the requester only when both the first group A and the second group B have successfully executed the operation request. In other words, as long as one group fails to successfully execute the operation request, the CSE returns information of execution failure of the operation request.

As an example, for example, in the scenario illustrated above in FIG. 1, the user's mobile phone may access the home gateway in the home through a wireless network, an application capable of remotely controlling family appliances through an application of the home gateway may be installed within the mobile phone, for example, it is possible to control lighting facility (e.g., lights in individual rooms), thermostat facility (e.g., air conditioning or heating in a room), or sanitary facility (e.g., electric water heater), cooking facility (e.g., electric rice cooker), and so on, through the application (which serves as the management server CSE) of the home gateway. Herein, the application in the mobile phone may serve as a requester that sends the operation request in FIG. 6, that is, an entity that sends the request, and the corresponding application in the home gateway may serve as the management server or the common service entity CSE, and may create application entity groups respectively corresponding to different types of facility in the home, for example, groups corresponding to lighting facility, thermostat facility, or sanitary facility, respectively, and each of the groups includes members capable of executing the operation request (e.g., executing the operation request for turning on the corresponding facility). For example, when an activation operation request is received, the light in the room is turned on, the air conditioner or the warming device is turned on, and the electric water heater is turned on for heating, so that when the user arrives at home, various facilities are prepared. Alternatively, it is also possible to set the facility in one room as a group without specific restrictions, in which case one group may include different types of application entities, upon receiving an activation operation, each of the entities in the room is activated. As an example, the user may set respective groups in an application of the home gateway and associate the respective groups in advance.

As another specific application example, for example, the user may create two groups in an application, which serves as the management server, in the home gateway, take an air conditioner in a living room as an application entity of a first facility group, and an electric water heater in a bathroom as an application entity of a second facility group, and associate the two facility groups as a progressive relationship. In addition, with respect to the first group A corresponding to the air conditioner in the living room, a subscription to the application entity request is set on the application (e.g., CSE) of the home gateway. Thus, upon receiving the request from the corresponding application entity, the CSE may send a notification to the first group A to trigger the members in the first group A to execute the corresponding operation request. For example, the user sends an operation request for opening a facility to the home gateway by using the application in the mobile phone on the way back to home, for example, an activation instruction "ON". After the operation request from the application (e.g., application entity AE) in the user's mobile phone has been received and authentication has been passed, the CSE on the home gateway sends a notification request to the first group A that subscribes to the application entity request, thereby activating the members in the first group A to execute the corresponding operation request. In this example, the members in the first group A, i.e., the air conditioner in the living room, is turned on to control a proper room temperature. Afterwards, the first group A returns a notification response message to the CSE. After receiving the notification response message from the first group A, the CSE gathers, analyzes the notification response message to determine whether the first group A has successfully executed the operation request. After determining that the air conditioner in the living room has been successfully turned on, the CSE queries the association identifier and the association attribute value in the group resource corresponding to the first group A, and finds out that the group associated with the first group A is the second group B and the association relationship between them is a progressive relationship. Thus, the CSE sends an operation request to the second group B, thereby activating the second group B that serves as a progressive relationship. The member in the second group B, i.e., the application entity AE corresponding to the electric water heater in the bathroom, activates the electric water heater in the bathroom upon receiving the operation request from the CSE, to start heating and maintain the water temperature when water is heated to a predetermined water temperature. The user only needs to send the operation request to the home gateway through the application in the mobile phone, the facility corresponding to the application entity group that serves as a progressive relationship can be automatically activated according to settings related to the application entity groups in the application of the home gateway, tedious steps of sending the operation request to respective entity groups separately by the user are saved, and data communication traffic and management efficiency of facility are improved.

In the above example, since a progressive relationship is established between two entity groups and the two entity groups are associated, it is achieved that a plurality of associated facility groups are controlled by a simple operation instruction, after one entity group corresponding to one facility group has successfully executed the operation request, members in another entity group corresponding to another facility group are activated in time to execute the operation request, thereby automation level and management efficiency are improved.

Although in the above embodiment of the present disclosure, the first group A and the second group B include only one member as an example each, it should be understood that, the first group and the second group may include more than one member as needed. In addition, the principles of the present disclosure are not limited to two groups, and the members in a group are not limited to belonging to a same type, as long as members in a group can process the same operation request.

In addition, in the above embodiment, the first group is set to subscribe to an application entity request to the CSE, so that when the CSE receives the operation request from the application entity, the members in the first group can be triggered to process the operation request. However, there may be other ways in which the CSE automatically triggers the first group upon receiving the application entity request from the requester, for example, the CSE directly forwards to the members in the first group when the CSE receives the operation request from the requester; or, the CSE periodically forwards the operation request from the requester to the members in the first group, the present disclosure makes no limitations thereto.

Figure 7:
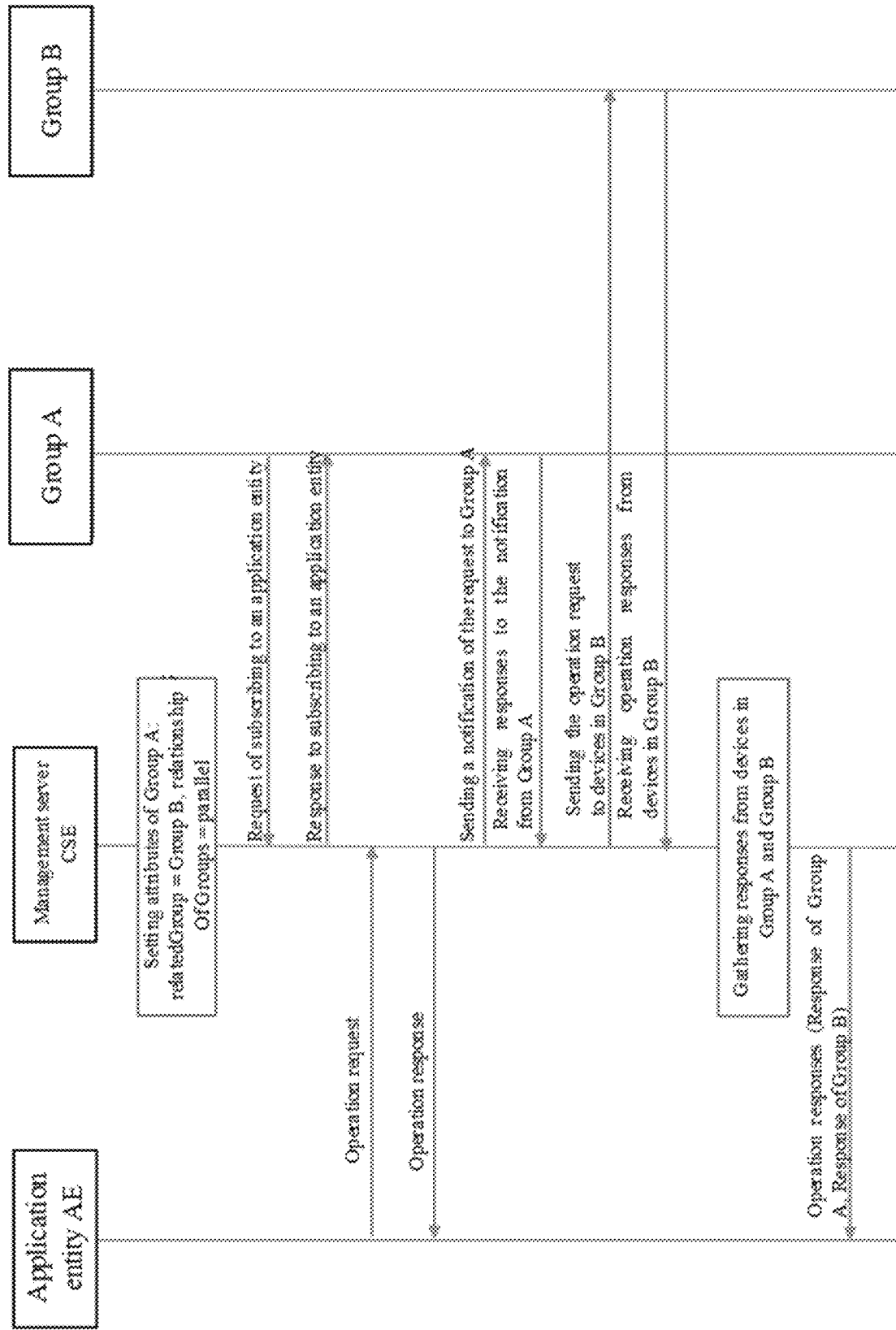
FIG. 7 illustrates yet another exemplary process of processing an operation request by using associated groups according to an embodiment of the present disclosure.

The process of using the added association identifier relatedGroup and the association attribute value relationshipofGroups to implement that a plurality of groups process the operation request from the requester according to another embodiment of the present disclosure will be described below to FIG. 7.

In this embodiment, the first group A and the second group B are also adopted for description, wherein each group includes at least one member capable of executing an operation request from the requester. For example, an association identifier relatedGroup in a group resource corresponding to the first group A is set to point to an identifier of the second group B, and the association attribute value relationshipofGroups is set to be a parallel relationship. Thus, the first group A and the second group B are associated, and the association relationship between them is set as a parallel relationship. As shown in FIG. 7, optionally, the first group A may subscribe to an application entity request to the management server (e.g., the common service entity CSE), so that when the CSE receives an operation request from the requestor, the CSE may send the operation request to the first group A. As shown in FIG. 7, an entity sends an operation request to the management server, for example, the application entity AE sends an operation request to the common service entity CSE. Upon receiving the operation request, the CSE processes the request, obtains information on the group for executing the operation request and the group members, and forwards the operation request to all members in the group. In the example shown in FIG. 7, the CSE obtains information on the first group A and the members in the first group A, and forwards the operation request to all members in the first group A. Similarly, when the CSE processes the operation request, the CSE may first authentication an identity of the requester of the operation request. After the authentication has been successfully passed, the CSE notifies the operation request to the first group A that subscribes to the application entity request. As shown in FIG. 7, upon receiving the operation request sent from the CSE, all members included in the first group A are activated to execute the operation request, and execution results are returned as feedback to the CSE. In addition, the CSE determines a group that has a parallel relationship with the first group A by querying the association identifier and association attribute value set in the group resource for the first group A. For example, if the association identifier relatedGroup in the group resource corresponding to the first group A points to the identifier of the second group B, and the association attribute value relationshipofGroups is set as a parallel relationship, it can be determined that the second group B is the group that has a parallel relationship with the first group A. At this time, the members in the second group B that serves as a parallel relationship can be triggered to also execute the operation request. Specifically, the CSE obtains information on the second group B and the members in the second group B, and forwards the operation request to all members in the group B. As shown in FIG. 7, upon receiving the operation request sent from the CSE, all members included in the second group B are activated to execute the operation request, and execution results are returned as feedback to the CSE. The CSE receives the execution results returned by all members in the first group A and the second group B, and analyzes, gathers the results to determine whether the operation request has been successfully executed. When the first group A includes more than one member, various policies may be set to determine whether the operation request has been successfully executed by the first group A, or whether the operation request has been successfully executed by the first group A may be determined according to the association attribute value, for example, it may be set that only all members in the first group A have successfully executed the operation request, it is determined that the operation request has been successfully executed by the first group A. Or, it may be set that, as long as more than half of the members in the first group A have successfully executed the operation request, it is determined that the operation request has been successfully executed by the first group A. The specific determination policy can be determined according to application requirements, which is not limited herein. Similarly, when the second group B includes more than one member, various policies may also be set to determine whether the operation request has been successfully executed by the second group B. Afterwards, the CSE returns an operation response to the requester, that is, both the execution result of the first group A and the execution result of the second group B are returned to the requester, so that the requester can decide a next action based on the received operation response. For example, a backup group of the group which returns an operation response of execution failure may be triggered to execute the operation request.

In the above embodiment, the first group is used to subscribe to the application entity request to the CSE, the first group is set to be associated with the second group, and the association relationship is set to a parallel relationship, so that when an operation request from the application entity is received by the CSE, a notification message is automatically sent to the first group that subscribes to the application entity request, so as to trigger the members in the first group to execute the operation request; meanwhile, since the second group is associated with the first group, the second group B can be found by querying the association identifier and the association attribute value set in the group resource of the first group A, and the members in the second group B are also triggered to execute the operation request. Tedious steps of sending the operation request to respective entity groups separately by the user are saved, data communication traffic and management efficiency of facility are improved.

As an example, in the scenario illustrated above in FIG. 1, the user's mobile phone may access the home gateway in the home through a wireless network, an application capable of remotely controlling family appliances through the home gateway may be installed in the mobile phone, for example, it is possible to control lighting facility (e.g., lights in individual rooms), thermostat facility (e.g., air conditioning or heating in a room), or sanitary facility (e.g., electric water heater), cooking facility (e.g., electric rice cooker), and so on, through an application (which serves as the management server CSE) of the home gateway. Herein, the application in the mobile phone may serve as the requester that sends the operation request in FIG. 7, that is, the entity that sends the request, and the corresponding application in the home gateway may serve as the management server or the common service entity CSE, and can create application entity groups respectively corresponding to different types of facility in the home, for example, groups corresponding to lighting facility, thermostat facility, or sanitary facility, respectively, and each of the groups includes members capable of executing the operation request (e.g., executing the operation request for turning on the corresponding facility). Optionally, it is also possible to set the facility in one room as a group, no limitations are made to the specific manners, in which case one group may include different types of application entities, upon receiving an activation operation, each of the entities in the room is activated. As an example, the user may set respective groups in an application of the home gateway and associate the respective groups in advance.

As another specific application example, for example, the user may create two groups in an application, which serves as a management server, of the home gateway, take an electric rice cooker in the kitchen as an application entity of a first facility group, a bathroom washing machine as a second facility group, and associate the two groups as a parallel relationship. The user may put rice and water into the electric rice cooker before leaving for work in the morning, and put clothes that need to be washed into the washing machine, and set a time length for cooking and washing. In addition, as for the first group A corresponding to the electric rice cooker, a subscription to the application entity request is set on the application (e.g., the CSE) of the home gateway. Thus, upon receiving the request from the corresponding application entity, the CSE may send a notification to the first group A to trigger the members in the first group A to execute the corresponding operation request. For example, the user may use the application in the mobile phone to send an operation request for activating facility to the home gateway before getting off work, for example, the activation instruction "ON". After the operation request (e.g., "ON") is received from the application (e.g., an application entity AE) of the user's mobile phone and authentication has been passed, the CSE on the home gateway sends a notification message to the first group A that subscribes to the application entity request, thereby activating the members in the first group A to execute the corresponding operation request. In this example, the members in the first group A are activated, i.e., the electric rice cooker is activated to start cooking. In the meantime, since the first group A is associated with the second group B, the CSE can find the second group B by querying the association identifier and the association attribute value set in the group resource of the first group A, and trigger the members in the second group B to also execute the operation request. In this example, the washing machine can be activated to start laundry.

Afterwards, the first group A returns a notification response message to the CSE, and the second group B feeds back an operation response to the CSE. The CSE analyzes, gathers the response of the first group A and the response of the second group B, and feeds back their responses to the requester, e.g., the application in the user's mobile phone, so that the user can obtain the execution result of the operation request in time and take an appropriate next action.

In the above example, as for the first group A, subscription to the application entity request is made on the CSE, and the second group B and the first group A are associated as a parallel relationship, thereby it is possible to avoid the user from sending the operation requests for the first group and the second group to the home gateway separately, that is, in this example, there is no need for the user to separately send the operation instructions of controlling the electric rice cooker and the washing machine to the home gateway through the mobile phone, data communication traffic is saved, and thus automation level and facility management effectiveness are improved.

In the above example, since the parallel relationship is established between two entity groups, and the two groups are associated, it is achieved that a simple operation instruction can be used to control the associated plurality of facility groups, it only needs to send an operation request to the entity group to which one facility group corresponds, the associated plurality of facility groups can be activated to execute the operation request, and thus automation level and management efficiency are improved.

Similarly, in the above embodiment, for convenience of explanation, the first group A and the second group B respectively include only one member, but it should be understood that, the first group and the second group may include more than one member as required, and the members in a group are not limited to the same type, as long as members in the group can process the same operation request (e.g., the request for turning on or turning off).

Some embodiments of the present disclosure are described above with reference to specific examples, and main implementations of the principles of the present disclosure are described in detail with respect to the backup relationship, the progressive relationship and the parallel relationship of the associated groups, respectively. It should be noted that, the description is mainly directed to the smart home scenario in the above embodiment, but the principles of the present disclosure may also be applied to many fields such as industrial control, security and fire protection, intelligent transportation, and the like, which are not limited herein. It should be noted that the above embodiment is directed to the case where the groups desired to be associated have been established. In the following embodiment, the principles of the present disclosure will be further described with reference to the establishing process of group.

Figure 8:
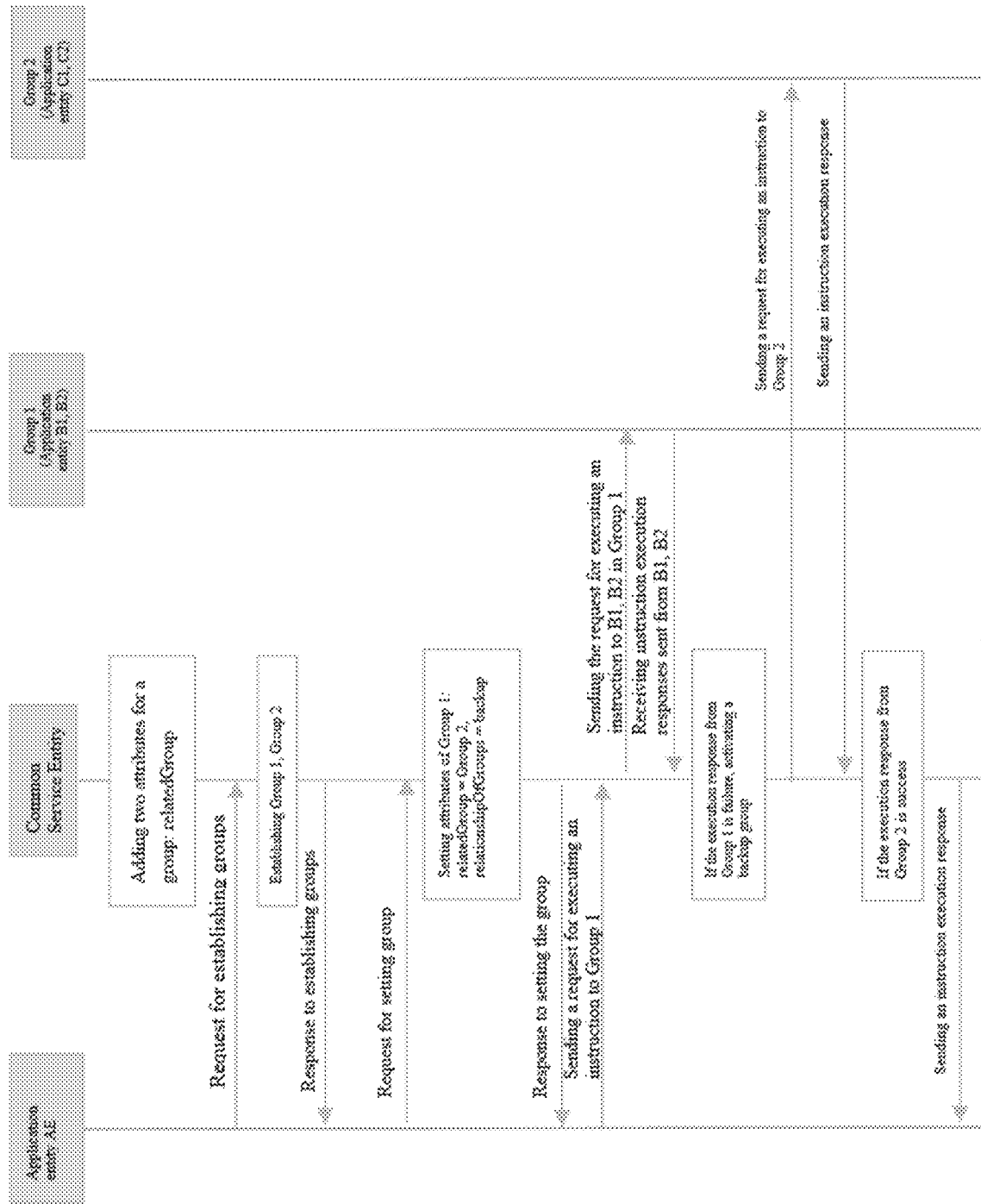
FIG. 8 illustrates a schematic process of processing an operation request by using created associated groups according to an embodiment of the present disclosure.

As shown in FIG. 8, two attributes including the association identifier relatedGroup and the association attribute value relationOfGroups shown in FIG. 4, are added to the group resource group on the common service entity CSE. When a certain application entity wants to create group resources on the CSE, it sends a request for establishing groups to the CSE. Upon receiving the request for creating groups, the CSE creates corresponding groups, for example, group 1 and group 2, after authentication has been passed, wherein each group may include a plurality of application entities; thereafter, the CSE sends a response of group establishment completion to the application entity that serves as the requester. Upon receiving a response of group establishment completion, the application entity may request to set attributes of the group as required, for example, set the attribute of group 1, wherein the association identifier relatedGroup in the group resource of group 1 is set as an identifier of group 2, and the association attribute value relationOfGroups is set as, for example, backup. Correspondingly, the CSE returns a group attribute setting response to the application entity, so as to complete the group establishing request for the application entity. When the application entity sends an operation request to the CSE (e.g., the application entity may implement this by setting the association resource attribute value of group 1 through an update request), the CSE first sends an instruction for executing the operation request to the members in group 1, and upon receiving the instruction, the members in group 1 execute the operation request and returns execution results to the CSE as a response. The CSE receives the execution response from the members in group 1 and determines whether the members in group 1 have successfully executed the operation request. If the operation request fails to be executed successfully, the CSE sends an instruction for executing the operation request to members in the associated group 2 which serves as a backup group by querying the association identifier relatedGroup and the association attribute value relationOfGroups in the group resource of group 1. Similarly, after the operation request is executed, the members in group 2 return execution responses to the CSE. After gathering, analyzing the execution responses from the members in group 2, the CSE sends a response of execution of the operation request to the application entity which serves as the requester. For example, if the members in the group 2 have successfully executed the operation response, the CSE sends a response of successful execution of the operation request to the application entity which serves as the requester.

The process from, with respect to a request from an application entity, establishing the associated groups to using the associated groups to process the operation request from the application entity according to the principles of the present disclosure is illustrated above in conjunction with FIG. 8. It should be noted that the backup relationship is adopted as an example in the above, however, the principles of the present disclosure may also be totally applicable to the progressive relationship, the parallel relationship, or the association relationship such as an interlocking relationship, which are not described herein again.

Figure 9:
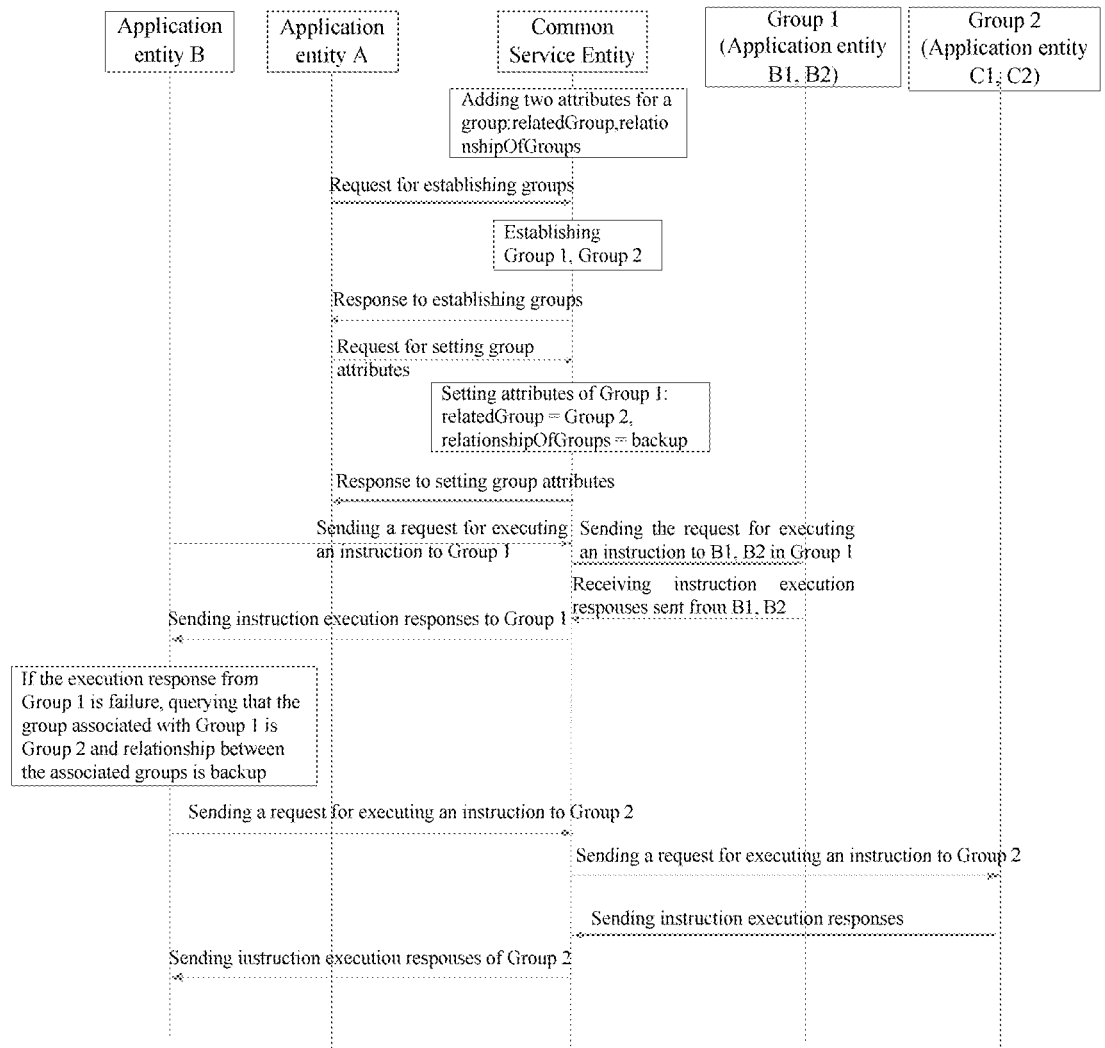
FIG. 9 illustrates an exemplary process of processing an operation request by using created associated groups according to an embodiment of the present disclosure.

Slightly different from the process shown in FIG. 8, FIG. 9 illustrates an example in which different application entities respectively issue a request to create groups and instructing the established groups to execute an operation request. As shown in FIG. 9, two attributes including the association identifier relatedGroup and the association attribute value relationOfGroups shown in FIG. 4, are added to the group resource group on the common service entity CSE. Upon receiving a group establishment request sent from the application entity A, the CSE establishes, for example, two groups, group 1 and group 2, each group includes a plurality of application entities; thereafter, the CSE sends a response of successful establishment of the group to the application entity A; afterwards, the application entity A sends a request for setting a group attribute to the CSE, correspondingly, the CSE sets the association identifier of group 1 as the identifier of group 2, for example, the ID or the name of group 2, that is, relatedGroup=group2, and the association attribute value is set as, for example, backup, that is, the relationshipOfGroups=backup, then the CSE sends a response of group attribute setting to the application entity A, thus completing association setting of the groups. As described above, different from FIG. 8, an operation request may be sent by another entity, for example, an application entity B, to the CSE. For example, the request may be implemented through an update request to set a resource related to group 1. Upon receiving the operation request from the application entity B, the CSE sends an instruction of executing the operation request to the members in group 1, correspondingly, respective members in group 1 execute the operation request, and return results of executing the operation request to the CSE as a response. The CSE gathers, analyzes execution results returned by the members in group 1 and returns a response of execution of the operation request to the application entity B. At this point, the CSE can analyze to determine whether the members in group 1 have successfully executed the operation request, and return a final determination result to the application entity B. Alternatively, the CSE may forward the execution responses from the group 1 directly to the application entity B, and the application entity B may determine whether the members in group 1 have successfully executed the operation request by itself. Regardless of what manners are adopted, when it is determined that the members in group 1 fail to successfully execute the operation request, the group associated with group 1 may be queried by the CSE or the application entity B, when it is determined that the group associated with group 1 is group 2 and the relationship between them is a backup relationship, the application entity B may send an operation request to the common service entity CSE, and the CSE sends the operation request to the members in group 2 that is a backup of group 1 to execute the operation request; correspondingly, the CSE receives execution results sent by the members in group 2 as a response of execution of the operation request, and returns the response of execution of the operation request to the application entity B.

In the embodiment described above in conjunction with FIG. 9, the application entity that sets the associated groups and the entity that uses the associated groups to execute the operation request are different entities. In practice, the application entity that sets the associated groups and the entity that uses the associated groups to execute the operation request may also be located on different hardware terminals. For example, in the above scenario of controlling home facility by using the mobile phone, one mobile phone may be used as a host to send a request for setting associated groups to the home gateway so as to set associated groups for respective home facilities, and the other mobile phones may serve as slaves, and may send a corresponding operation request to the home gateway, so as to execute an operation request by using the associated group set by the mobile phone which serves as the host.

Figure 10:
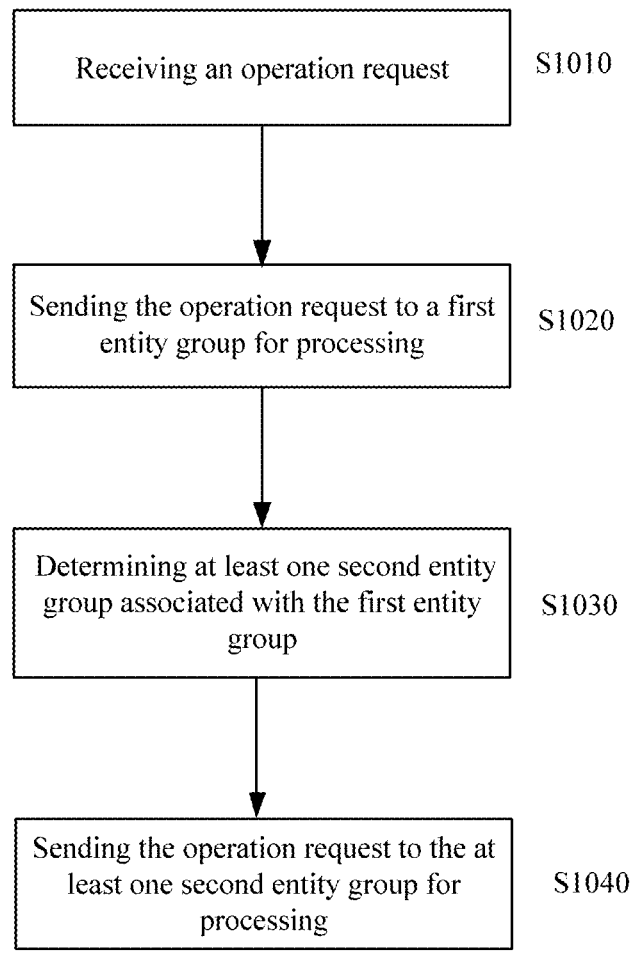
FIG. 10 is a schematic flowchart of a method for processing an operation request by using associated groups according to an embodiment of the present disclosure.

FIG. 10 illustrates a method of processing an operation request according to an embodiment of the present disclosure, said method comprises the steps of: S1010, receiving an operation request from an entity; S1020, sending the operation request to a first entity group for processing; S1030, determining at least one second entity group associated with the first entity group; and S1040, sending the operation request to the at least one second entity group for processing the operation request.

Sending the operation request to the at least one second entity group for processing the operation request is sending the operation request to each determined second entity group.

Optionally, the method further comprises: associating the first entity group and the at least one second entity group.

Here, each entity group includes at least one member for processing the operation request.

Optionally, the method further comprises: adding an association identifier and an association attribute value to a resource corresponding to the first entity group, the association identifier indicating an identifier of an entity group associated with the first entity group, and the association attribute value indicating an association relationship between the first entity group and said entity group.

Optionally, associating the first entity group and the at least one second entity group comprises: setting a value of the association identifier as an identifier of the second entity group, and setting the association attribute value as indicating an association relationship that is at least one of a backup relationship, a progressive relationship, a parallel relationship, or an interlocking relationship.

Optionally, the method further comprises: querying the association identifier and the association attribute value included in the resource corresponding to the first entity group, to determine the second entity group associated with the first entity group and the association relationship between the second entity group and the first entity group.

Optionally, sending the operation request to a first entity group for processing comprises: sending the operation request to all members in the first entity group for processing the operation request, and receiving processing results returned by respective members in the first entity group.

Optionally, the method further comprises: when the returned processing results indicate that the operation request fail to be successfully processed, activating members in the second entity group that has a backup relationship with the first entity group to process the operation request. In other words, the method further comprises: determining that an association relationship between the first entity group and the at least one second entity group is a backup relationship; and sending the operation request to the at least one second entity group for processing when the returned processing results indicate that the operation request has not been successfully processed.

Optionally, the method further comprises: when the returned results indicate that the operation request has been successfully processed, activating members included in the second entity group that has a progressive relationship with the first entity group to process the operation request. In other words, the method further comprises: determining that an association relationship between the first entity group and the at least one second entity group is a progressive relationship; and sending the operation request to the at least one second entity group for processing when the returned processing results indicate that the operation request has been successfully processed.

Optionally, the method further comprises: activating members included in the first entity group to process the operation request and members in the second entity group that has a parallel relationship with the first entity group to process the operation request. Specifically, determining that an association relationship between the first entity group and the at least one second entity group is a parallel relationship; and sending the operation request to the at least one second entity group for processing after the operation request is sent to the first entity group with no need to wait for the first entity group to return a processing result.

Optionally, the method further comprises: gathering processing results returned by the members in the entity groups that process the operation request, and feeding back the processing results to the entity that sends the operation request.

Optionally, the method further comprises: receiving a request for establishing an entity group, and establishing a first entity group and at least one second entity group.

Optionally, the request for establishing the entity group and the operation request come from the same entity or different entities.

Optionally, the method further comprises: gathering processing results returned by entity groups that process the operation request, and feeding back the processing results to an entity that sends the operation request comprises:

gathering processing results from all members in the first entity group as a processing result of the first entity group; and in the case that the at least one second entity group has processed the operation request, gathering processing results from all members in the at least one second entity group as a processing result of the second entity group; and performing a logical operation on the processing result of the first entity group and the processing result of the at least one second entity group to obtain a final processing result, and feeding it back to the entity that sends the operation request.

Optionally, an identifier of an entity group includes: a resource identifier or a resource name of a resource corresponding to the entity group.

Optionally, the method further comprises: receiving a request for subscribing to an application entity from the first entity group; and when the operation request from the application entity is received, automatically sending a notification to the first entity group so as to activate members in the first entity group to process the operation request.

Figure 11:
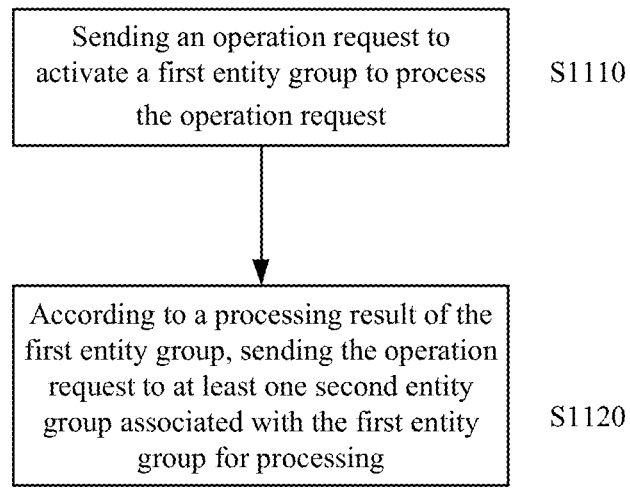
FIG. 11 is a schematic flowchart of a method for processing an operation request by using associated groups according to an embodiment of the present disclosure.

FIG. 11 illustrates another method for processing an operation request according to an embodiment of the present disclosure, said method comprises the steps of: S1110, sending an operation request to activate a first entity group to process the operation request; and S1120, according to a processing result of the first entity group, sending the operation request to at least one second entity group associated with the first entity group for processing.

Here, the resource corresponding to the first entity group includes an association identifier and an association attribute value, the association identifier indicates an identifier of the at least one second entity group associated with the first entity group, the association attribute value indicates an association relationship between the first entity group and the at least one second entity group; a value of the association identifier in the resource corresponding to the first entity group is set as an identifier of the at least one second entity group, and the association attribute value indicates an association relationship existing between the first entity group and the second entity group.

Optionally, the association relationship is a backup relationship, a progressive relationship, a parallel relationship, or an interlocking relationship.

In an implementation, the method further comprises: determining that an association relationship between the first entity group and the at least one second entity group is a backup relationship; and sending the operation request to the at least one second entity group for processing when the returned processing results indicate that the operation request has not been successfully processed.

In an implementation, the method further comprises: determining that an association relationship between the first entity group and the at least one second entity group is a progressive relationship; and sending the operation request to the at least one second entity group for processing when the returned processing results indicate that the operation request has been successfully processed In an implementation, the method further comprises: determining that an association relationship between the first entity group and the at least one second entity group is a parallel relationship; and sending the operation request to the at least one second entity group for processing after the operation request is sent to the first entity group.

Optionally, the method further comprises determining, according to a resource corresponding to the first entity group, the at least one second entity group associated with the first entity group.

Optionally, the resource corresponding to the first entity group includes an association identifier and an association attribute value, the association identifier indicates an identifier of the at least one second entity group associated with the first entity group, the association attribute value indicates an association relationship between the first entity group and the at least one second entity group.

Optionally, an identifier of the at least one second entity group includes: a resource identifier or a resource name of a resource corresponding to the at least one second entity group.

Optionally, a value of the association identifier in the resource corresponding to the first entity group is set as an identifier of the at least one second entity group, and the association attribute value indicates an association relationship which is at least one of a backup relationship, a progressive relationship, or a parallel relationship.

Optionally, the method further comprises: receiving processing results returned by members in the first entity group; activating members included in the second entity group that has a backup relationship to process the operation request when the returned results indicate that the operation request fails to be successfully processed.

Optionally, the method further comprises: receiving processing results returned by members in the first entity group; activating members included in the second entity group that has a progressive relationship with the first entity group to process the operation request when the returned results indicate that the operation request has been successfully processed.

Optionally, the method further comprises: activating members included in the second entity group that has a parallel relationship to process the operation request.

Figure 12:
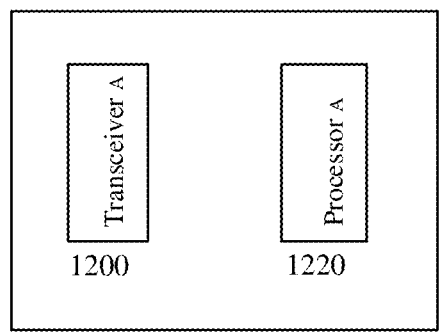
FIG. 12 is a schematic block diagram of a control device according to an embodiment of the present disclosure.

According to an aspect of the present disclosure, there is further provided a control device. As shown in FIG. 12, the control device comprises a transceiver 1200 configured to receive an operation request from an entity and send the operation request to a first entity group for processing; and a processor 1220 configured to determine at least one second entity group associated with the first entity group, and instruct the transceiver to send the operation request to at least one second entity group for processing.

Figure 13:
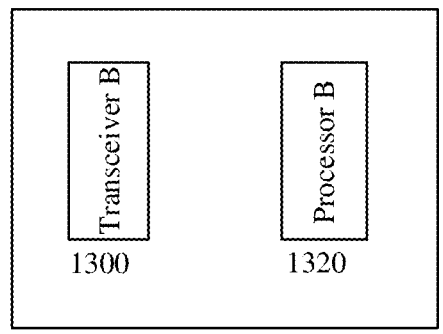
FIG. 13 is a schematic block diagram of a communication device according to an embodiment of the present disclosure.

According to another aspect of the present disclosure, there is further provided a communication device. As shown in FIG. 13, the communication device comprises: a transceiver 1300 configured to send an operation request to activate a first entity group to process the operation request; and a processor 1320 configured to instruct, according to a processing result of the first entity group, the transceiver to send the operation request to at least one second entity group associated with the first entity group for processing.

According to yet another aspect of the present disclosure, there is further provided a control device, comprising a processor, a memory connected to the processor, and a transceiver, wherein the memory stores instructions, the processor is configured to execute the following steps when running instructions stored in the memory: instructing the transceiver to receive an operation request from an entity, and sending the operation request to a first entity group for processing; determining by the processor at least one second entity group associated with the first entity group, and activating the at least one second entity group to process the operation request.

Optionally, the above communication device is a user terminal, including but not limited to at least one of the following: a smart phone, a PDA, a tablet, and a navigator.

Optionally, the above control device is a terminal, including but not limited to, at least one of the following: a server, a gateway, and a set-top box.

A person skilled in the art will understand that the block diagrams appearing in this specification represent illustrative conceptual views of circuits that implement the principles of the present disclosure. Similarly, it will be understood that any flowsheet, flowchart, state transition diagram, pseudo-code etc. represents a variety of processes that can be substantially represented in computer-readable mediums and executed by a computer or processor, no matter whether the computer or processor is clearly showed. Written computer readable mediums and codes may be implemented in a transitory (signal) state and a non-transitory state (e.g., on a tangible medium such as CD-ROM, DVD, Blu-ray, hard driver, flash memory card, or other types of tangible storage mediums).

Functions of the various elements shown in the drawings may be provided by the use of dedicated hardware and hardware capable of executing software in conjunction with suitable software. When provided by a processor, these functions may be provided by a single dedicated processor or a single shared processor or multiple independent processors some of which may be shared. Also, an explicit use of the term "processor" or "controller" should not be interpreted as exclusively referring to hardware capable of executing software, but may implicitly include, without limitation, digital signal processor ("DSP") hardware, read only memory ("ROM") for storing software, random access memory ("RAM"), and nonvolatile memory.

Other hardware, conventional and/or customizable, may also be included. Similarly, any switches shown in the figures are merely conceptual. Their functionality can be interoperable through the operation of program logic, dedicated logic, program control, and dedicated logic or even achieved manually, and the implementer can select a particular technology based on a more detailed understanding of the context.

Although embodiments incorporating the teachings of the present disclosure have been shown and described in detail herein, a person skilled in the art can readily devise many other varied embodiments that still incorporate these teachings. It should be noted that modifications and variations can be made by a person skilled in the art based on the above teachings.

Some specific embodiments have been described above. However, it should be understood that these embodiments may be modified. For example, elements of different embodiments may be combined, complemented, modified, and deleted to obtain other embodiments. In addition, those of ordinary skill in the art should understand that other structures and processing flows may be used to replace the structures and processing flows that have been disclosed above to obtain other embodiments. The other embodiments achieve substantially the same functions, at least in substantially the same way, to achieve substantially the same effect provided by the embodiments of the present disclosure. Accordingly, these and the other embodiments should fall within the scope of the present disclosure.

The present application claims priority of the Chinese patent application No. 201610994874.2 filed on Nov. 11, 2016, the entire disclosure of which is hereby incorporated in full text by reference as part of the present application.

What is claimed is:

1. A method for processing an operation request, comprising:
 receiving an operation request;
 sending the operation request to a first entity group for processing;
 determining at least one second entity group associated with the first entity group;
 sending the operation request to the at least one second entity group for processing; and
 gathering processing results returned by entity groups that process the operation request, and feeding back the processing results to an entity that sends the operation request,
 wherein gathering processing results returned by entity groups that process the operation request and feeding back the processing results to an entity that sends the operation request comprises:

gathering processing results from all members in the first entity group as a processing result of the first entity group; and in the case that the at least one second entity group has processed the operation request, gathering processing results from all members in the at least one second entity group as a processing result of the second entity group; and performing a logical operation on the processing result of the first entity group and the processing result of the at least one second entity group to obtain a final processing result, and feeding it back to the entity that sends the operation request.

2. The method according to claim 1, further comprising:
determining an association relationship between the at least one second entity group and the first entity group.

3. The method according to claim 2, wherein a resource corresponding to the first entity group includes an association identifier and an association attribute value,
said method further comprising:
setting a value of the association identifier as an identifier of the at least one second entity group, and setting the association attribute value as indicating an association relationship existing between the first entity group and the at least one second entity group.

4. The method according to claim 3, wherein the identifier of the entity group includes: a resource identifier or a resource name of a resource corresponding to the entity group.

5. The method according to claim 2, wherein the association relationship is a backup relationship, a progressive relationship, a parallel relationship, or an interlocking relationship.

6. The method according to claim 5, wherein sending the operation request to a first entity group for processing comprises:
activating members in the first entity group to process the operation request, and receiving processing results returned by the members in the first entity group.

7. The method according to claim 6, further comprising:
sending the operation request to the at least one second entity group for processing, in case that it is determined that an association relationship between the first entity group and the at least one second entity group is a backup relationship and the returned processing results indicate that the operation request fails to be successfully processed by the first entity group.

8. The method according to claim 6, further comprising:
sending the operation request to the at least one second entity group for processing in case that it is determined that an association relationship between the first entity group and the at least one second entity group is a progressive relationship and the returned processing results indicate that the operation request has been successfully processed by the first entity group.

9. The method according to claim 6, further comprising:
sending the operation request to the at least one second entity group for processing after the operation request is sent to the first entity group in case that it is determined that an association relationship between the first entity group and the at least one second entity group is a parallel relationship.

10. The method according to claim 1, further comprising:
receiving a request for subscribing to an application entity from the first entity group; and upon receiving an operation request from the application entity, sending a notification to the first entity group so as to activate the first entity group to process the operation request.

11. A method for processing an operation request, comprising:
sending an operation request so as to activate a first entity group to process the operation request;
sending, according to a processing result of the first entity group, the operation request to at least one second entity group associated with the first entity group for processing; and
receiving processing results returned by entity groups that process the operation request,
wherein the processing results are obtained by:
gathering processing results from all members in the first entity group as a processing result of the first entity group; and
in the case that the at least one second entity group has processed the operation request, gathering processing results from all members in the at least one second entity group as a processing result of the second entity group; and
performing a logical operation on the processing result of the first entity group and the processing result of the at least one second entity group to obtain the final processing results.

12. The method according to claim 11, further comprising:
determining, according to a resource corresponding to the first entity group, the at least one second entity group associated with the first entity group.

13. The method according to claim 12, wherein the resource corresponding to the first entity group includes an association identifier and an association attribute value;
wherein a value of the association identifier in the resource corresponding to the first entity group is set as an identifier of the at least one second entity group, and the association attribute value indicates an association relationship existing between the first entity group and the second entity group.

14. The method according to claim 13, wherein the association relationship is a backup relationship, a progressive relationship, a parallel relationship, or an interlocking relationship.

15. The method according to claim 14, further comprising:
sending the operation request to the at least one second entity group for processing, in case that it is determined that an association relationship between the first entity group and the at least one second entity group is a backup relationship and the returned processing results indicate that the operation request fails to be successfully processed by the first entity group.

16. The method according to claim 14, further comprising:
sending the operation request to the at least one second entity group for processing in case that it is determined that an association relationship between the first entity group and the at least one second entity group is a progressive relationship and the returned processing results indicate that the operation request has been successfully processed by the first entity group.

17. The method according to claim 14, further comprising:
sending the operation request to the at least one second entity group for processing after the operation request is sent to the first entity group in case that it is determined that an association relationship between the first entity group and the at least one second entity group is a parallel relationship.

18. A control device, comprising:
a transceiver configured to receive an operation request from an entity and send the operation request to a first entity group for processing; and
a processor configured to determine at least one second entity group associated with the first entity group, and instruct the transceiver to send the operation request to at least one second entity group for processing,
wherein the processor is further configured to gather processing results returned by entity groups that process the operation request, and feed back the processing results to an entity that sends the operation request,
wherein gathering processing results returned by entity groups that process the operation request and feeding back the processing results to an entity that sends the operation request comprises:
gathering processing results from all members in the first entity group as a processing result of the first entity group; and
in the case that the at least one second entity group has processed the operation request, gathering processing results from all members in the at least one second entity group as a processing result of the second entity group; and
performing a logical operation on the processing result of the first entity group and the processing result of the at least one second entity group to obtain a final processing result, and feeding it back to the entity that sends the operation request.

* * * * *